Oct. 7, 1941.  J. A. CURTIS  2,258,135

PIPE JOINT

Filed Jan. 17, 1941  5 Sheets-Sheet 1

INVENTOR
John A. Curtis
BY
Louis Presat Whitaker
ATTORNEY

Oct. 7, 1941.   J. A. CURTIS   2,258,135
PIPE JOINT
Filed Jan. 17, 1941   5 Sheets-Sheet 2

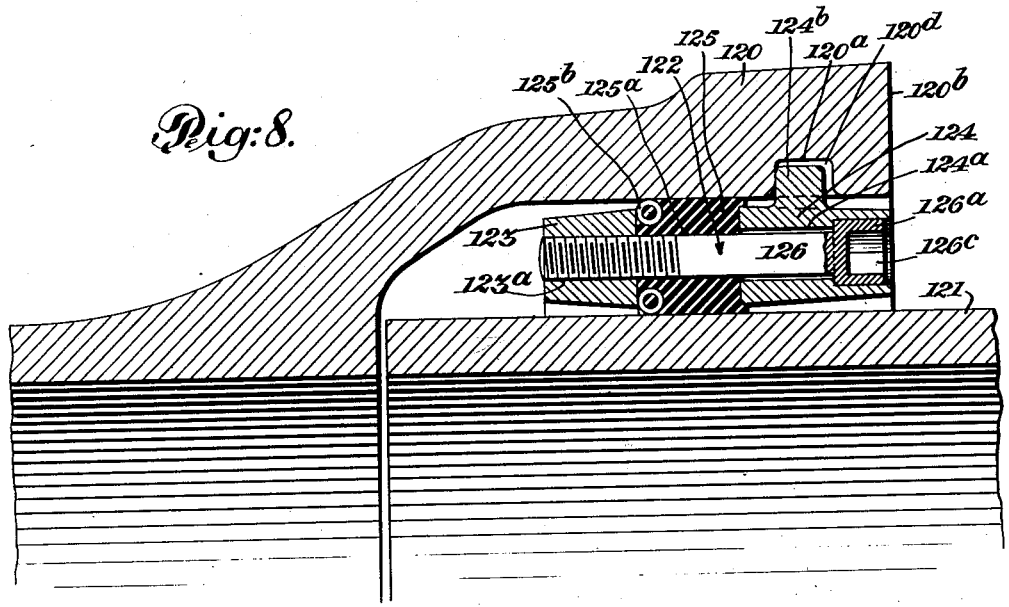
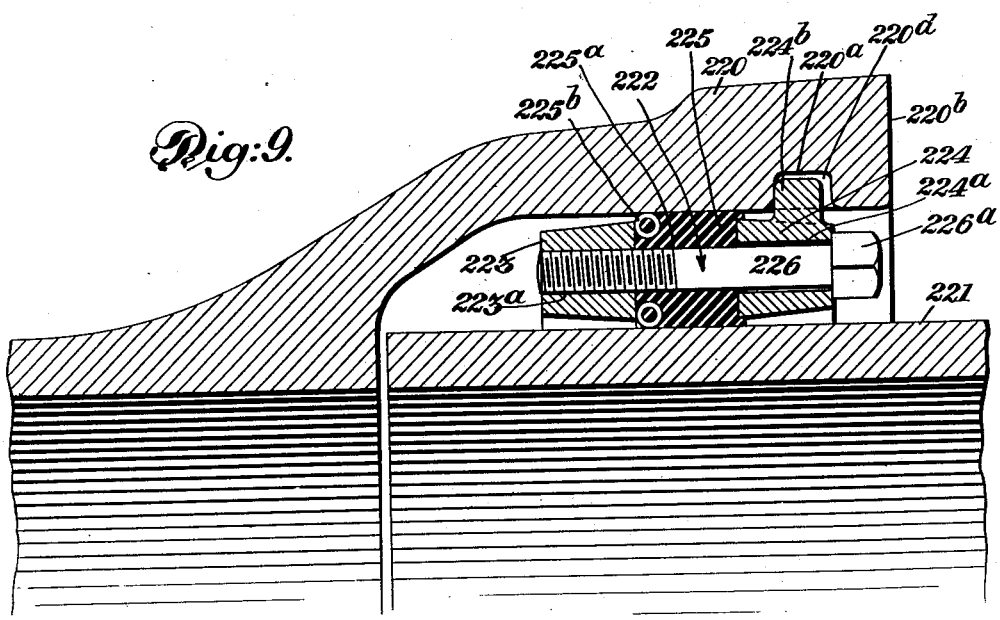

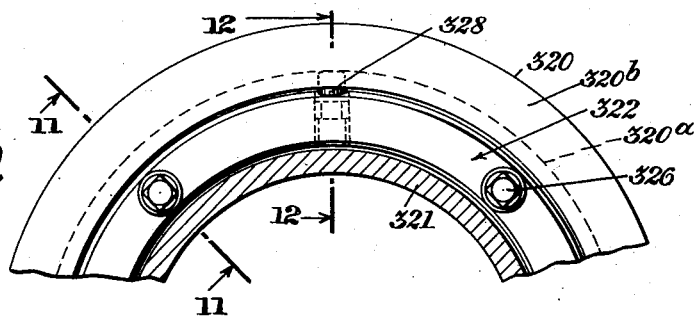
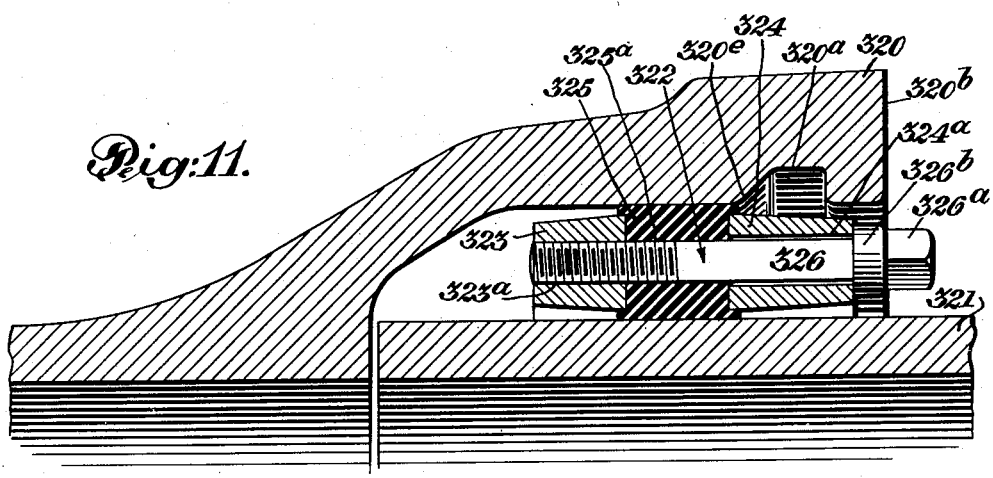
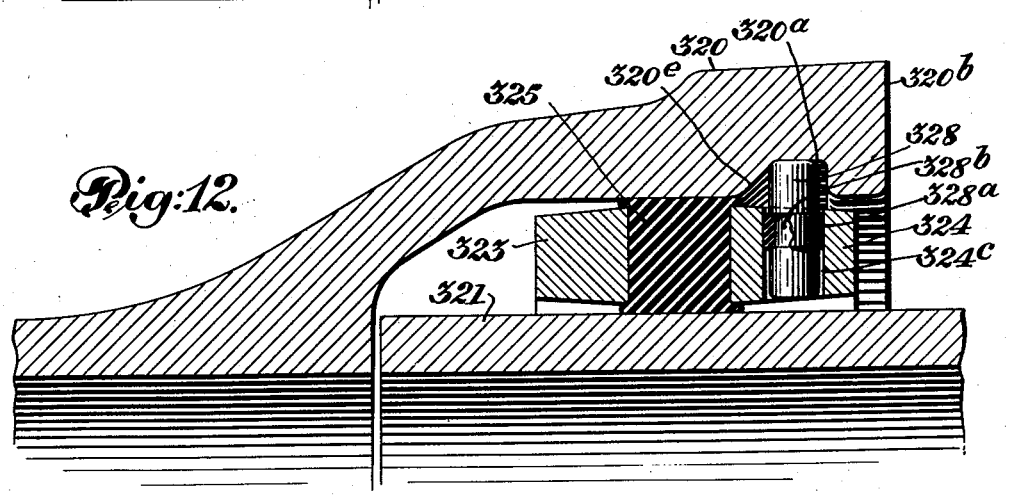
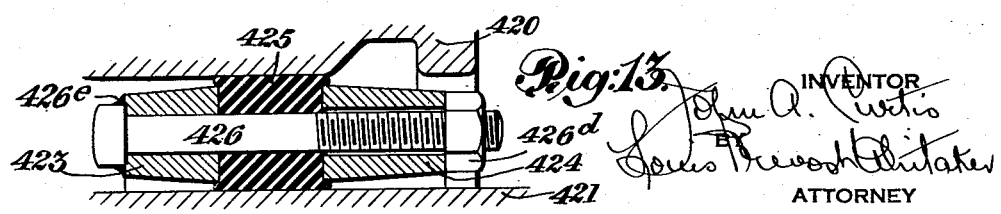

Oct. 7, 1941.                J. A. CURTIS                2,258,135
                              PIPE JOINT
             Filed Jan. 17, 1941            5 Sheets-Sheet 5

John A. Curtis INVENTOR
BY
Louis Prescott Whitaker
ATTORNEY

Patented Oct. 7, 1941

2,258,135

UNITED STATES PATENT OFFICE 2,258,135

PIPE JOINT

John A. Curtis, Greenville, Pa., assignor to Dresser Manufacturing Company, Bradford, Pa., a corporation of Pennsylvania Application January 17, 1941, Serial No. 374,850

7 Claims. (Cl. 285—165)

My invention consists in the novel features hereinafter described, reference being made to the accompanying drawings, which show several embodiments of my invention, selected by me for the purpose of illustration, and my invention is fully disclosed in the following specification and claims.

My invention relates to pipe joints of the bell and spigot type, in which a plain end of one pipe section is inserted in a sleeve or collar of larger diameter provided at the adjacent end of the adjoining pipe section with an annular space therebetween. It has been common practice to seal such joints by calking said annular space with lead or cementitious material. However, calked joints of this kind frequently develop leaks and have been found generally unsatisfactory. There has hence been a demand for an inexpensive mechanical joint in which the seal is effected by compressing a gasket of rubber or like material.

Various mechanical joints for bell and spigot pipe have been previously proposed. These joints generally comprise an anchor ring seating behind the scarf of the bell, a clamping ring, a gasket between the clamping ring and the face of the bell and bolts for drawing the clamping ring toward the face of the bell to compress the packing. While such joints are ordinarily more reliable than joints of the calked lead or cement type, they have not been found entirely satisfactory. One serious objection is that since the anchor ring, clamping ring, bolts and nuts are all exterior of the pipe, they are particularly subject to mechanical injury and to attack by corrosive action of the soil when the pipe is buried. Moreover, since the bolts are located outside the scarf of the bell and pass through holes in the outer peripheral portions of the anchor ring and clamping ring while the inner peripheral portions of said rings engage the bell and the gasket respectively, the force exerted by the bolts puts the anchor ring and clamping ring under torsional strain and results in the bolts being subjected both to tension and to bending moment. This strain may cause failure in itself or may result in more rapid intergranular corrosion.

A further objection to these clamps is that if assembled at the factory, they must be disassembled in order to apply them to the pipe. The anchor ring must either be slipped the full length of the pipe—a considerable task when heavy cast iron pipe is being joined—or must be made in two or more sections which are placed around the pipe and bolted together. In assembling the clamp in the field, parts may be dropped and lost, particularly when working under unfavorable conditions, as in a narrow trench or in mud. The clamp is further objectionable in close quarter work since the bolts and outer peripherial portions of the anchor and clamping rings protrude radially beyond the scarf of the bell and substantially increase the overall diameter of the joint.

Bell and spigot pipe joints have also been proposed in which a packing ring is held in place by bolts or screws extending through holes drilled in the bell. As bell and spigot pipe is commonly of cast iron and is made in long sections which are difficult to handle, the drilling, and in some instances tapping, of such holes presents a difficult machining operation.

It is an object of the present invention to overcome these defects and provide an improved pipe joint which is inexpensive to manufacture, can be easily and rapidly installed and is durable and reliable in service. In accordance with the invention, the entire packing unit comprising two follower rings, a gasket and bolts for drawing the follower rings toward one another, is disposed in the annular space between the bell and spigot where it is protected from the corrosive action of the soil and from mechanical injury. The packing unit is positively locked in place by radial projections on one of the follower rings engaging a suitable recess or groove in the interior of the bell. As the recess or groove can be easily formed in casting, no drilling, tapping or other machining operations on the pipe are required to prepare it for reception of the packing unit.

The complete packing unit can be assembled at the factory and need not be disassembled to be installed. There is thus no danger of any parts becoming lost. The unit is particularly compact, thus facilitating packing and shipping. Each of the follower rings is preferably of integral construction as distinguished from the more expensive and weaker sectional rings required in certain of the prior art joints. Installation of the packing unit is remarkably simple, the preassembled unit being merely slipped into the bell of one pipe section, locked in place, the plain end of the other pipe section stabbed into the pipe receiving opening of the unit and the gasket expanded into sealing contact with the bell and spigot by tightening the bolts which connect the two follower rings. The finished joint is very workmanlike because of the absence of protruding flanges, and the diameter of the joint is kept at a minimum, making it possible to install the joint in close quarters. The joint possesses great flexibility, withstanding considerable angular deviation of adjoining sections of pipe without being in any way impaired. The pull exerted by the bolts is directly in line with the resistance offered by the gasket and twisting strain on the bolts or follower rings is thereby avoided.

In addition to joining two lengths of pipe, the present invention can be used for joining other pipe members. For example, closure members or other fittings such as T's, elbows or crosses may be joined either to the bell end or the plain end of the pipe or to another fitting.

Other features and advantages of the invention will be understood from the following description of the embodiments shown by way of example in the accompanying drawings, in which Fig. 1 represents an elevation partially in section of a coupling for the adjacent ends of two bell and spigot pipe sections, the packing unit being shown in the position in which it is first inserted in the bell end of one pipe section.

Fig. 8 is a sectional view similar to Fig. 4, but showing a slightly modified form of packing unit.

Fig. 9 is a sectional view similar to Fig. 8 and showing another modification.

Fig. 10 is a fragmentary end elevation partially in section of a further modification of the invention.

Fig. 11 is a sectional view taken on line 11—11 of Fig. 10.

Fig. 12 is a sectional view taken on line 12—12 of Fig. 10.

Fig. 13 is a fragmentary sectional view corresponding to Fig. 11 and showing a further modification of the packing unit.

Figure 1:
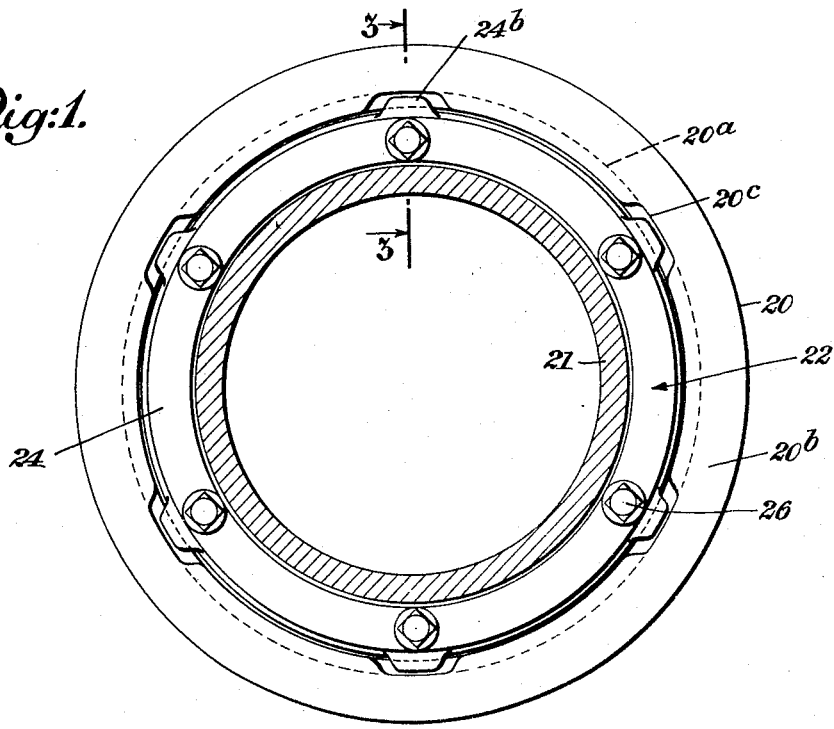

In Figs. 1 to 4 of the drawings, there is shown a pipe joint embodying the invention and comprising a bell end 20 of one pipe section, a plain or spigot end 21 of the adjacent pipe section and a packing unit fitting in the annular space between the bell and spigot and designated in general by the reference numeral 22. The interior surface of the bell 20 is recessed to provide a circumferentially extending groove or recess 20a, spaced from the end face 20b of the bell. A plurality of spaced slots or groove portions 20c extend inwardly from the end face of the bell and connected with the circumferentially extending groove 20a. At one or more points, the circumferentially extending groove 20a is interrupted by a stop 20d. While only one stop is shown in the drawings, it will be understood that the circumferentially extending groove 20a may, if desired, be interrupted between each pair of successive slots 20c, so as to form in effect a circumferential series of grooves or depressions rather than a continuous groove. These groove portions in conjunction with the slots 20c would thus constitute a series of L-shaped or T-shaped grooves extending inwardly from the end face of the bell. When the pipe is of cast iron, the groove 20a and slots 20c can be readily formed in the casting operation. Thus, no additional machine operation is required in forming the bell end of the pipe. The spigot end of the pipe likewise requires no special operations and can be perfectly plain as shown.

The packing unit 22 comprises an inner follower ring 23, an outer follower ring 24, a gasket 25 and a plurality of bolts 26 connecting the two follower rings. In the drawings these bolts are shown in the form of stud bolts or cap screws which extend through bolt holes 24a and 25a in the outer follower ring and gasket, respectively, and are screwed into threaded holes 23a in the inner follower ring. The bolt is provided with a suitable head 26a and may have a cylindrical collar 26b between the head and shank of the bolt.

The outer follower ring is provided with a plurality of radial projections or lugs 24b which are adapted to engage in the circumferentially extending groove 20a of the bell 20 and are spaced around the outer periphery of the follower ring. The spacing of the lugs 24b is the same as that of the slots 20c in the bell so that the lugs may be inserted through the slots 20c in installing the packing unit. At least three such lugs are preferably provided on the outer follower ring. In the embodiment shown, the number of lugs 24b is the same as the number of bolts 26 and the lugs are so arranged that one lug is adjacent each bolt hole formed in the outer follower ring. The material forming the lug 24 thereby serves to reinforce the follower ring adjacent the bolt hole where it would otherwise be weakened.

Figure 3:
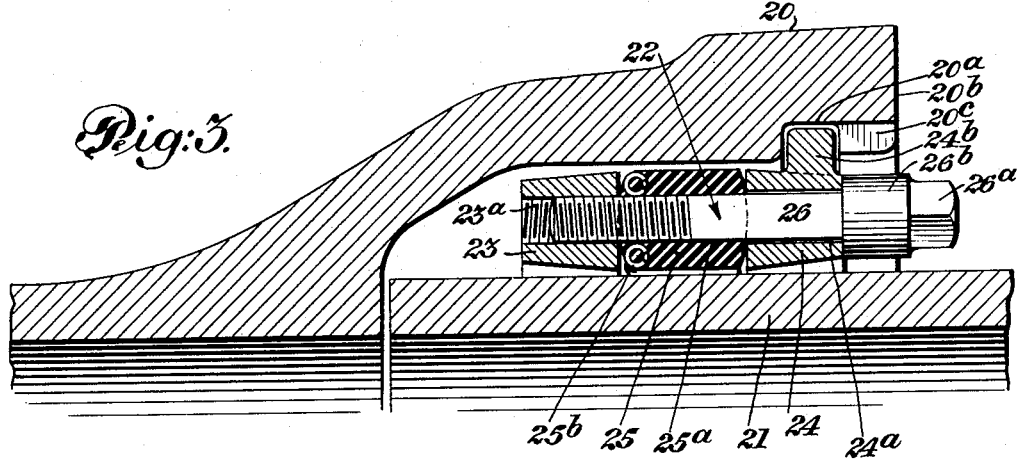
Fig. 3 is a sectional view of the pipe joint taken on line 3—3 of Fig. 1.
Figure 4:
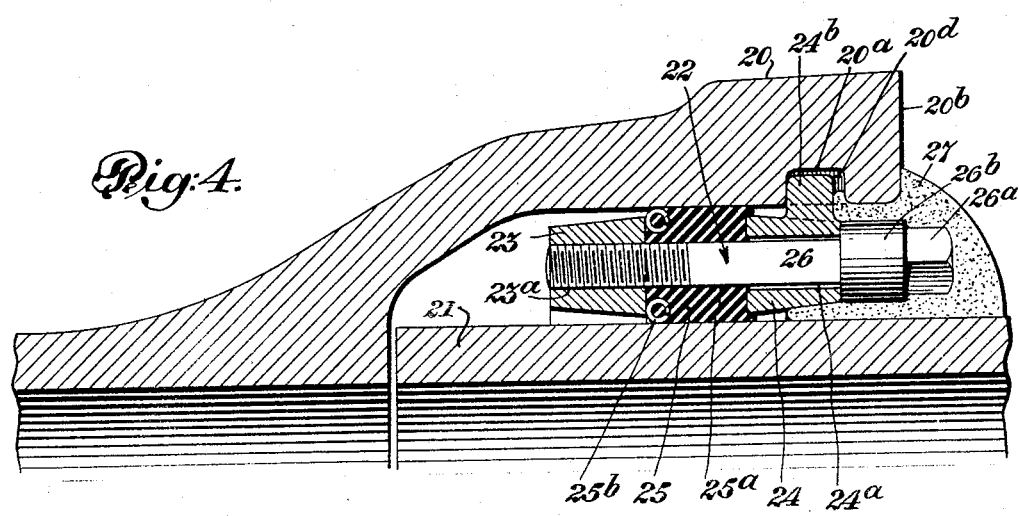
Fig. 4 is a sectional view taken on the line 4—4 of Fig. 2 showing the packing unit locked in position and the bolts tightened to expand the gasket into sealing contact with the bell and spigot.

As will be seen from Figs. 3 and 4 of the drawings each of the follower rings 23, 24 is tapered longitudinally in cross section so that one end face of the ring is larger than the opposite face. The rings are so arranged that the larger face of each ring engages the gasket 25. The relatively large gasket engaging faces of the rings minimizes the tendency of the gasket material to flow past the rings when the latter are drawn toward one another by means of the bolts 26, while the tapered cross section of the rings provides greater clearance between the free ends of the rings and the adjacent surfaces of the bell and spigot, resulting in a particularly flexible construction which permits considerable misalignment of the adjacent pipe sections without impairing the effectiveness of the packing unit.

Figure 5:
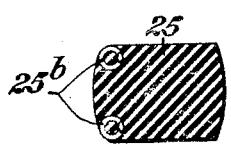
Fig. 5 is a cross sectional view of the gasket taken between the bolt holes.

The gasket shown in cross section in Fig. 5 is preferably formed of rubber or rubber-like material. The end faces of the gasket are of convex curvature to keep cold flow at a minimum while facilitating the lateral expansion of the gasket into sealing engagement with the bell and spigot when the follower rings are drawn up. While cold flow of the gasket material is minimized by the shape of the gasket and the construction of the follower rings above described, the corners of the gasket are shown reinforced and protected by flexible coils 25b. The convolutions of the coils 25b are close together, being preferably in contact with one another, thereby preventing extrusion of the gasket material through the coils. If desired the gasket may be armored at each corner instead of at two corners only, as shown.

Figure 6:
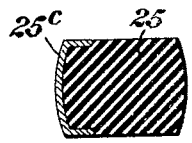
Fig. 6 is a cross sectional view of a different form of gasket.
Figure 7:
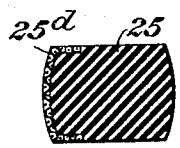
Fig. 7 is a cross sectional view of a further form of gasket.

In Figs. 6 and 7 there are shown alternative forms of gaskets that may be used. The gasket shown in Fig. 6 has a layer 25c of lead or other pliable metal covering one end face of the gasket, while in Fig. 7 the end face of the gasket is protected by a layer 25d of canvas or like material. Obviously both ends of the gasket may be covered, if desired.

Figure 2:
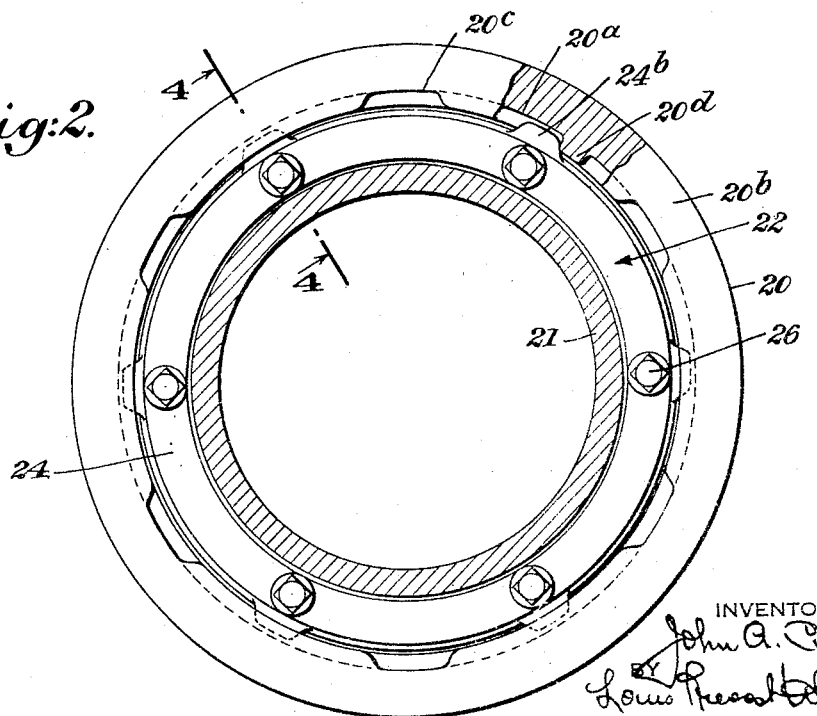
Fig. 2 is a view similar to Fig. 1, but showing the packing unit rotated relative to the bell to lock it in position.

In installing the joint, the entire packing unit comprising the gasket, the two follower rings and connecting bolts are assembled in advance, preferably at the factory where the parts are made. The bolts 26 are screwed up sufficiently to hold the parts in place, but without compressing the gasket 25. The assembled packing unit is preferably packaged and shipped in this form. In joining two sections of pipe the preassembled packing unit is slipped into the bell end of one section, the lugs 24b passing through the slots 20c (Figs. 1 and 3) and the packing unit is then rotated relative to the bell sufficiently to position the lugs 24b in the circumferentially extending groove 20a out of alignment with the slots 20c (Figs. 2 and 4). The stop 20d limits the relative rotation of the packing unit and the bell. The spigot end of the other pipe section is then slipped into place in the pipe receiving opening of the packing unit and the bolts 26 are tightened to draw the follower rings toward each other and thereby expand the gasket 25 laterally into sealing contact with the bell and spigot. It will be understood that the stop 20d prevents the rotation of the packing unit when tightening the bolt.

Alternatively, the joint can be installed by slipping the preassembled packing unit over the spigot end of one pipe section. positioning the spigot in the bell of the other section, sliding the packing unit into the annular space between the bell and spigot, rotating the unit relative to the bell to lock the unit in position and then tighten the bolts 26 as before. In either case it is not necessary or desirable to disassemble the packing unit in the bell in order to install it and there is thus no danger of parts being lost. The joint can be made quickly and easily even when working in limited space, and no tools are required other than a wrench for tightening the bolts.

As will be seen from Figs. 3 and 4 of the drawings, the pull exerted by the bolts 26 is in direct alignment with the resistance offered by the gasket 25 and the objectionable torsional stress inherent in the external type clamps heretofore used, are thereby wholly avoided. Moreover, as the packing unit is disposed in the annular space between the bell and spigot, it is protected both from mechanical injury and from the corrosive action of the soil commonly encountered when the pipe line is underground.

If desired, the outer ends of the bolts 26 and the outer face of the follower ring 24 may be covered by plastic or cementitious material, as illustrated at 27 in Fig. 4. With the application of this material, the packing unit is completely enclosed and is fully protected from the corrosive action of the soil.

A further embodiment of the invention is shown in Fig. 8 in which corresponding parts are designated by the same reference numerals with the addition of 100. In this embodiment the heads 126a of bolts 126 are countersunk in the outer follower ring 124 and the outer ends of the bolt and the outer face of the follower ring are made substantially flush with the end face 120b of the bell 120. To facilitate turning the bolts in the limited space available, the bolt heads may be made cylindrical and provided with a non-circular socket 126c for the reception of a suitable tool. With this construction the pipe joint has a particularly neat and workmanlike appearance and is well protected from mechanical injury or corrosive attack.

Another form of the invention is shown in Fig. 9, corresponding parts being indicated by the same reference numerals as in Figs. 1 to 4 with the addition of 200. In this form the bolt heads 226a are not countersunk, but the parts are so proportioned that the outer ends of the bolts are substantially flush with the end face 220b of the bell 220. The bolts may be of the socket type shown in Fig. 8 or ordinary stud bolts as illustrated in Fig. 9. In the embodiment of Figs. 8 and 9 it will be seen that none of the packing unit projects beyond the end face of the bell. The unit is thus even more fully protected from mechanical injury or corrosive attack than in the previous form. The packing units are assembled and installed exactly as described in connection with Figs. 1 to 4 and the outer end faces of the units may have, if desired, a covering of plastic or cementitious material.

In the embodiment shown in Figs. 10 to 12, corresponding parts are designated by the same reference numerals as in Figs. 1 to 4 with the addition of 300. This embodiment is substantially the same as those previously described, except that the integral radial projections of the outer follower ring which engage in the circumferentially extending groove of the bell are replaced by sliding pins 328. These pins are slidably disposed in radially extending holes 324c provided in the outer follower ring 324 and have an inner position in which the outer ends of the pins are substantially flush with the outer peripheral surface of the follower ring, permitting insertion of the packing unit in the bell, and an outer position in which the outer ends of the pins project beyond the outer peripheral surface of the follower ring and are adapted to engage in the circumferentially extending groove 320a.

It will be seen that the pins 328 are of such length that when in their outer position the inner ends of the pins are substantially flush with the inner peripheral surface of the follower ring (Fig. 12). In order to hold the pins frictionally in the position in which they are placed, each pin is surrounded intermediate its ends by a frictional sleeve 328a which is preferably seated in an annular recess 328b formed in the pin. The ring 328a may be formed of rubber or similar material and frictionally engages the walls of the radial holes 324c in which the pins are located.

In installing the packing unit shown in Figs. 10 to 12, the unit is assembled in advance as with the other embodiments. With the pins 328 in their inner positions the packing unit is slipped into place in the bell portion of one pipe section. The pins 328 are then moved to their outer positions in which they engage in the groove 320a of the bell 320, thereby locking the packing unit in the bell. It will be understood that the pins 328 will be held in their outer positions by the frictional engagement of the rubber sleeves 328a with the walls of the radially extending holes 324c in the outer follower ring. The spigot end of the other pipe section is then inserted in the pipe receiving opening of the packing unit. By referring to Fig. 12 it will be seen that when the spigot is in place, the pins 328 are positively held in their outer positions, inward movement of the pins being prevented by the engagement of the inner ends of the pins with the spigot. The bolts 326 are then tightened to expand the gasket 325 into sealing engagement with the bell and spigot.

Owing to the radial movement of the projecting pins 324, it is unnecessary in this embodiment of the invention to provide the interior of the bell 320 with slots corresponding to the slots 20c of the form shown in Figs. 1 to 4. However, it will be appreciated that the packing unit shown in Figs. 10 to 12 can, if desired, be used with a bell of the form illustrated in the preceding figures. To provide for the possibility that it may be wished to remove the packing unit from the bell, the rear face of the groove 320a is formed to provide an inclined cam surface 320e. By moving the packing unit axially inwardly from the position shown in Fig. 12, the spigot 321, having been withdrawn, the pins 328 are moved by the cam surface 320e from their outer to their inner positions, whereupon the packing unit can be withdrawn from the bell.

In Fig. 13 there is shown a further form of the invention in which corresponding parts are designated by the same reference numerals as in Figs. 1 to 4 with the addition of 400. This embodiment is substantially the same as that illustrated in Figs. 10 to 12, except that the bolts 426 have their outer ends threaded and are provided with nuts 426d which may be screwed down against the end face of the outer follower ring 424. The bolts 426 are prevented from turning in any suitable manner, for example, by being welded or otherwise sealed to the inner follower ring as indicated at 426e. If the shank of the bolt 426 is strongly welded or otherwise secured in the inner follower ring, it will be understood that a headed bolt is not necessary. The term "bolt" is used in the description and the following claims in its generic sense to include the bolts provided with nuts as well as stud bolts, cap screws and the like which screw directly into threaded holes provided in the follower ring.

Figure 14:
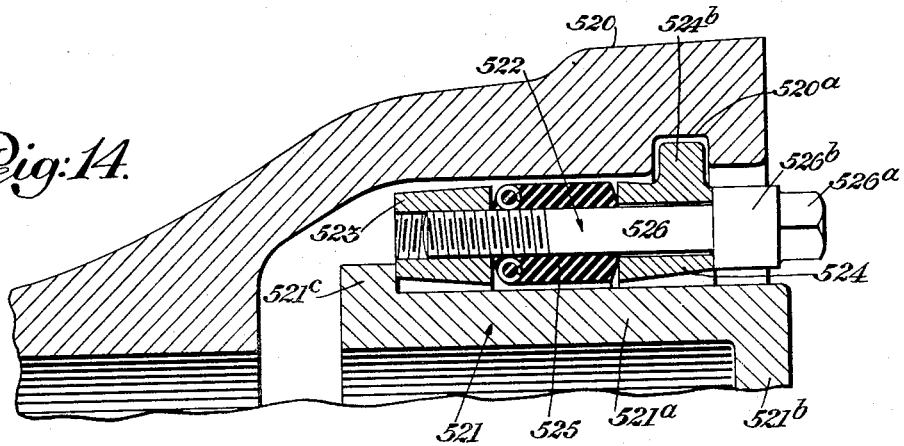
Fig. 14 is a sectional view similar to Fig. 3 and showing how the invention may be used in joining a closure member to the bell end of a pipe.

In addition to joining two sections of pipe, the pipe joint of the present invention can be used for joining other pipe members such as closure members, L's, T's, crosses or other pipe fittings. In Fig. 14 there is shown an application of the invention to a closure for the bell end of a pipe member which may be either a pipe section or a fitting. Similar parts are designated by the same reference numerals as in Fig. 3 with the addition of 500. The closure comprises the closure element 521 which fits into the bell 520 with an annular space therebetween, and a packing unit indicated generally by the reference numeral 522 for sealing the space between the closure element and the bell. The packing unit is substantially the same as that shown in Fig. 3, and comprises an inner follower ring 523, an outer follower ring 524, a gasket 525 between the two follower rings, and spaced bolts 526 extending through the gasket and connecting the two follower rings for drawing them toward one another to expand the gasket into sealing relation with the closure element and the bell. The outer follower ring has spaced projections or lugs 524b which engage in a circumferentially extending groove 520a, provided on the interior of the bell 520 to hold the packing unit against axial movement relative to the bell. The closure element 521 has a cylindrical portion 521a and an enclosure portion 521b. The closure portion 521b can be located at either end of the cylindrical portion 521a or anywhere between the ends thereof, but is shown at the outer end of the cylindrical portion as this presents a neater appearance. It will be understood that the closure element 521 could if desired be made in the form of a solid cylindrical plug, although this would represent an uneconomical use of material.

To prevent the ejection of the closure element by fluid pressure in the pipe, means is preferably provided for positively securing the closure element in the bell. As the packing unit 522 is positively held in the bell by the lugs 524b, the closure element can be secured in place by connecting it with the packing unit. Preferably the closure element is connected with the inner follower ring of the packing unit in such manner that pressure exerted on the closure element by fluid in the pipe is transmitted to the inner follower ring and is applied to gasket 525. With this arrangement the fluid pressure in the pipe tends to expand the gasket into sealing contact with the closure element and the bell and would maintain a tight seal even in the event of failure of one or more of the bolts 526. In the embodiment shown in Fig. 14 the connection between the closure element and the packing unit is obtained by providing the inner end of the closure element 521 with an outwardly projecting portion 521c which engages the inner follower ring 523. However, it will be understood that the closure element can be connected to the packing unit in any manner desired for example, by making it integral with one or the other of the follower rings, or by providing it with outwardly projecting apertured lugs through which the bolts 526 of the packing unit may be passed.

In installing the closure shown in Fig. 14, the preassembled packing unit 522 is preferably slipped into position on the closure element 521 and the entire assembly is then slipped into the bell of the pipe member and locked into position by the engagement of lugs 524b on the outer follower ring 524 with the grooves 520a in the bell. It will be understood that the bell 520 has spaced slots corresponding to slots 20c of Fig. 3 to permit entry of the lugs 524b into the groove 520a. The bolts 526 are then tightened to expand the gasket 525 laterally into sealing engagement with the closure element and the bell.

Figure 15:
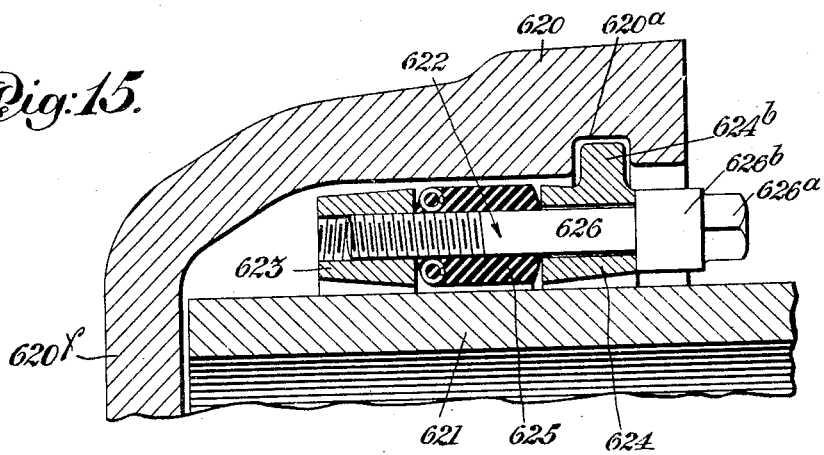
Fig. 15 is a sectional view similar to Fig. 14 and showing a closure element for the plain end of a pipe.

In Fig. 15 there is shown an application of the invention to a closure for the plain or spigot end of a pipe member. In this embodiment the closure element comprises a bell portion 620 corresponding in form to the bell end of a pipe section, and an end portion 620f closing the end of the bell. The bell portion 620 of the closure element fits over the spigot end 621 of the pipe member with an annular space therebetween for the packing unit 622. The bell portion 620 has on its interior a circumferentially extending groove 620a spaced from the end face of the bell and a series of spaced slots corresponding to slots 20c of Fig. 3 extending from the end face of the bell to the circumferential groove. Owing to the plane in which the section of Fig. 15 is taken these slots do not show in this figure. The packing unit 622 may be the same as that shown in Fig. 14 and comprises an inner follower ring 623, an outer follower ring 624 having spaced projections 624b engaging in said groove of the bell to hold the packing unit against axial movement relative to the bell, a gasket 625 between the two follower rings and spaced bolts 626 extending through the gasket and connecting the follower rings for drawing the follower rings toward one another to apply pressure to the gasket. In installing the closure shown in Fig. 15 the preassembled packing unit 622 is preferably secured in position inside the bell portion 620 of the closure member and the entire assembly is then slipped over the end of the pipe member 621. The bolts 626 are thereupon tightened to expand the gasket 625 into sealing engagement with the pipe member 621 and the bell portion 620 of the closure element.

Figure 16:
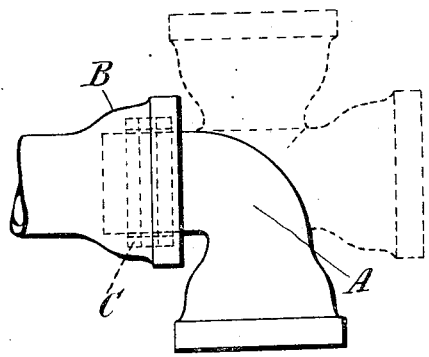
Fig. 16 is a diagrammatic view showing the application of the invention to pipe fittings such as elbows, T's and crosses.

Fig. 16 illustrates diagrammatically how a pipe fitting can be joined to a pipe section or to another pipe fitting by means of a pipe joint embodying the present invention. In this figure there is shown a pipe fitting A united to a pipe section D by means of a packing unit C. The packing unit C may be constructed and installed the same as in the embodiment of the invention shown in Figs. 1 to 15 and described above. The pipe fitting A may be in the form of an L, as shown in solid lines, or any other type of fitting such as a T or a cross as indicated by dotted lines in Fig. 16. Obviously, the present invention may be employed in uniting a pipe fitting with the spigot end as well as with the bell end of a pipe section.

What I claim and desire to secure by Letters Patent is:

1. In a pipe joint for bell and spigot pipe, the combination with a bell having its inner surface grooved to provide groove portions extending inwardly from the end face of the bell and connecting groove portions extending circumferentially of the bell, of a packing unit insertable in the annular space between the bell and spigot and comprising an inner follower ring, an outer follower ring having spaced projections adapted to be inserted through said inwardly extending groove portions and engageable in said circumferentially extending groove portions by limited relative rotation of the outer follower ring and the bell, a gasket between the two follower rings and spaced bolts for drawing the follower rings toward one another to expand the gasket laterally into sealing engagement with the bell and spigot.

2. In a joint for bell and spigot pipe, the combination with a bell having an internal circumferentially extending groove spaced from the end face of the bell, of a packing unit insertable in the annular space between the bell and spigot and comprising an inner follower ring, an outer follower ring having spaced projections engaging in said groove of the bell, a gasket between the two follower rings and spaced bolts for drawing the follower rings toward one another to expand the gasket into sealing engagement with the bell and spigot, the outer ends of the bolts being substantially flush with the end face of the bell when the packing unit is in sealing position.

3. In a joint for bell and spigot pipe, the combination with a bell having an internal, circumferentially extending groove spaced from the end face of the bell, of a packing unit disposed in the annular space between the bell and spigot and comprising an inner follower ring, an outer follower ring having spaced projections engaging in said groove of the bell, a gasket between the two follower rings and spaced bolts for drawing the follower rings toward one another to expand the gasket into sealing engagement with the bell and spigot, the outer end of the packing unit being covered by sealing material completely enclosing the unit in said annular space.

4. In a joint for bell and spigot pipe, the combination with a bell having an internal circumferentially extending groove spaced from the end face of the bell, of a packing unit fitting in the annular space between the bell and spigot and comprising an inner follower ring, an outer follower ring having spaced projections engaging in said groove of the bell, a gasket between the two follower rings and means for drawing the follower rings toward one another to expand the gasket into sealing engagement with the bell and spigot, the follower rings being tapered longitudinally in cross section with the larger face of the ring engaging the gasket.

5. In a joint for bell and spigot pipe, the combination with a bell having on its interior a recess spaced from the end face of the bell, of a packing unit fitting in the annular space between the bell and spigot and comprising an inner follower ring, an outer follower ring having a hole extending radially thereof, a pin slidable radially in said hole between an inner position permitting insertion of the packing unit in said annular space and an outer position in which the pin engages in said recess in the bell, a gasket between the two follower rings and means for drawing the follower rings toward one another to expand the gasket laterally into sealing engagement with the bell and spigot.

6. In an assembly for joining two pipe members comprising an inner pipe member and an outer pipe member having a bell portion fitting over the inner pipe member with an annular space therebetween, the combination with an outer pipe member having on the interior of the bell portion a circumferentially extending groove spaced from the end face of said bell, of a packing unit fitting in the annular space between the inner pipe member and the bell and comprising an inner follower ring, an outer follower ring having spaced projections engaging in said groove of the bell to hold the packing unit against axial movement relative to the bell, an annular gasket between the two follower rings and spaced bolts extending through the gasket and connecting the follower rings for drawing the follower rings toward one another to expand the gasket laterally to seal the space between the inner pipe member and the bell.

7. In a closure for bell and spigot pipe, the combination with a pipe member and a closure member fitting one inside the other with an annular space therebetween and provided with an internal, circumferentially extending groove in the outermost of said members, of a packing unit fitting in said annular space and comprising an inner follower ring, an outer follower ring having spaced projections engaging in said groove, a gasket between the two follower rings, and spaced bolts extending through the gasket and connecting the follower rings for drawing the follower rings toward one another to expand the gasket laterally to seal the space between the closure member and the pipe member.

JOHN A. CURTIS.